US008476586B2

(12) United States Patent
Misharin et al.

(10) Patent No.: US 8,476,586 B2
(45) Date of Patent: Jul. 2, 2013

(54) PORTABLE ION TRAP MASS SPECTROMETER WITH METAL HYDRIDE CONTAINER AS SOURCE OF HYDROGEN BUFFER GAS

(75) Inventors: Alexander Misharin, Columbia, MD (US); Vladimir M. Doroshenko, Sykesville, MD (US)

(73) Assignee: Science & Engineering Services, Inc., Columbia, MD (US)

( * ) Notice: Subject to any disclaimer, the term of this patent is extended or adjusted under 35 U.S.C. 154(b) by 206 days.

(21) Appl. No.: 13/168,690

(22) Filed: Jun. 24, 2011

(65) Prior Publication Data

US 2012/0326026 A1 Dec. 27, 2012

(51) Int. Cl.
*B01D 59/44* (2006.01)
*H01J 49/00* (2006.01)

(52) U.S. Cl.
USPC ........... 250/283; 250/281; 250/282; 250/287; 250/288; 250/290; 250/291; 250/292; 250/293

(58) Field of Classification Search
USPC .................. 250/281–283, 287, 288, 290–293
See application file for complete search history.

(56) References Cited

U.S. PATENT DOCUMENTS

2010/0163724 A1* 7/2010 Verbeck, IV ................. 250/283

OTHER PUBLICATIONS

Misharin et al. ("Development and characterization of field-deployable ion-trap mass spectrometer with and atmospheric pressure interface", Anal. Chem. 2012,84,10105-10112).*
U.S. Appl. No. 12/756,015, filed Apr. 7, 2010, Misharin, et al.

* cited by examiner

*Primary Examiner* — Jack Berman
*Assistant Examiner* — Meenakshi Sahu
(74) *Attorney, Agent, or Firm* — Oblon, Spivak, McClelland, Maier & Neustadt, L.L.P.

(57) ABSTRACT

A mass spectrometry (MS) method which includes generating in a vicinity of the quadrupole ion trap hydrogen molecules, directing at least part of the hydrogen molecules into the quadrupole ion trap cell, applying AC and DC voltages to quadrupole ion trap cell electrodes to create a combined AC/DC trapping field, placing sample ions inside the quadrupole ion trap cell, cooling at least part of said ions using said hydrogen molecules as a buffer gas, changing the combined AC/DC trapping field to eject the ions from the quadrupole ion trap cell, and detecting the ejected ions.

24 Claims, 9 Drawing Sheets

PORTABLE ION TRAP MASS SPECTROMETER WITH METAL HYDRIDE CONTAINER AS SOURCE OF HYDROGEN BUFFER GAS

STATEMENT REGARDING FEDERALLY SPONSORED RESEARCH OR DEVELOPMENT

This invention was made within Contract HSHQDC-09-C-00181 with the US Government so the US Government has certain rights on the use of this invention.

BACKGROUND OF THE INVENTION

1. Field of the Invention

This invention relates to mass spectrometry (MS), particularly to quadrupole ion trap mass spectrometry, an analytical method wherein a sample is analyzed via measuring masses of ions and their fragments.

2. Description of the Related Art

A quadrupole ion trap mass spectrometer (ITMS) is a versatile analytical device capable of MS and multiple MS ($MS^n$) measurements in a small package. Because of its small size it is frequently used in portable (field deployable) mass spectrometry applications. The ion trap cell of the ITMS instruments may have different geometry leading to different ITMS types. One common ion trap is a three-dimensional (3D) trap using one ring and two cap electrodes for generating the trapping quadrupole field inside the ion trap cell. Another common ion trap is a linear ion trap in which the ions are trapped within an ion trap cell having four linear rod electrodes and two trap electrodes placed at the ends of the four-rod structure. Examples of other ITMS or quadrupole ion trap-based types are toroid, cylindrical and rectilinear ion trap mass analyzers or a hybrid ion trap/time-of-flight mass analyzer.

In a quadrupole ion trap mass spectrometer the ions to be analyzed are first trapped inside an ion trap cell and then mass-analyzed by sequentially ejecting those (typically using resonance excitation) toward an ion detector via scanning RF/DC voltages applied to the trap electrodes for generating the trapping field. An important step of the ITMS operation is the cooling down of the trapped ions toward the ion trap cell center (where the trapping potential is minimal) before the ion ejection step. This is done in collisions of ions with buffer gas molecules which are present in the ion trap cell at typical pressure of $10^{-4}$-$10^{-3}$ Torr. ITMS is the only MS technique that can operate at such high pressures which is another reason why such analyzers are frequently used in portable MS systems as low vacuum reduces system pumping requirements. The buffer gas molecules have another function in tandem MS ($MS^n$) experiments where these molecules serve as a collisional partner to break down (to fragment) ions into product (fragment) ions. The requirements for selection of buffer molecules required in cooling and fragmentation steps are different. In the cooling step the buffer molecules should be as light as possible because heavy molecules can interfere with the following ejection steps by breaking down the coherent motion of the resonantly excited ions resulting in low mass resolution. In the fragmentation step, the highest fragmentation efficiency is achieved when the mass of the colliding partner/buffer molecule is as high as possible (V. M. Doroshenko, R. J. Cotter, Pulsed Gas Introduction for Increasing Peptide CID Efficiency in a MALDI/Quadrupole Ion Trap Mass Spectrometer, Anal. Chem., 1996, v. 68, 463-472).

Traditionally helium (MW=4 Da) is mainly used as a buffer gas in ITMS instruments. This light gas provides a good mass resolution in a broad mass range (typically up to 2,000 Da) and high fragmentation efficiency for peptide ions (typically analyzed in proteomics, a widespread ITMS application). The use of helium in portable MS devices has been problematic because of the heavy weight of gas cylinders used for storage of compressed gases and restrictions imposed on transportation of the compressed gases, especially by air shipment. For this reasons, substantial efforts have been taken to replace helium for air readily available from the environment (R. M. Danell, A. S. Danell, G. L. Glish, R. W. Vachet, "The use of static pressures of heavy gases within a quadrupole ion trap," J. Am. Soc. Mass. Spectrom., 2003, v. 10, 1099-1109). In general, some ITMS instruments can work with air as buffer gas but this severely reduces their mass resolution especially at high mass range.

The goal of the present invention (not realized before this invention) is to get rid of a heavy and large compressed gas cylinder typically providing ITMS with a helium buffer gas while maintaining ITMS performance at the level similar to that with helium buffer gas. The additional goal (not realized before this invention) is to provide easy transportability of ITMS by airplane that is important for a portable MS instrument.

The content of all sources cited herein is hereby incorporated by reference.

SUMMARY OF THE INVENTION

In one embodiment of the invention, there is provided a mass spectrometry (MS) method using a quadrupole ion trap which includes generating in a vicinity of the quadrupole ion trap hydrogen molecules, directing at least part of the hydrogen molecules into the quadrupole ion trap cell, applying AC and DC voltages to quadrupole ion trap cell electrodes to create a combined AC/DC trapping field, placing sample ions inside the quadrupole ion trap cell, cooling at least part of the ions inside the quadrupole ion trap cell using the hydrogen molecules as a buffer gas, scanning the combined AC/DC trapping field to eject the ions from the quadrupole ion trap cell, and detecting the ejected ions by measurement of mass-to-charge ratios of the ejected ions.

In another embodiment of the invention, there is provided a quadrupole ion trap mass spectrometer system having an ion trap cell, a hydrogen gas generator disposed in a vicinity of the quadrupole ion trap mass spectrometer system which has the capability to generate hydrogen molecules to be supplied as a buffer gas to the ion trap, and gas-handling mechanisms which supply the hydrogen molecules into the ion trap cell.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

This invention provides a system with ITMS performance similar to that with helium without using a compressed gas cylinder to provide the required buffer gas pressure inside an ion trap cell which can be shipped by air. Industry acceptance of the use of gases other than helium as a buffer gas in ITMS (such as air described above) will depend on the particular gas and performance of the ITMS using this alternative gas source. Unlike using heavy molecules as a buffer gas, ITMS performance with hydrogen buffer gas in many aspects is similar to that obtained with a helium buffer gas. However, hydrogen is a flammable/explosive gas and still requires compressed gas tank for storage. Liquefied hydrogen is not considered a viable alternative because its production, transportation, and storage in bulky cryostats impose prohibitive cost and maintenance limitations on its utilization in ITMS instruments, especially in portable ITMS. For this reason, until this invention, hydrogen was not a gas of choice for the buffer gas in ITMS instruments, including portable ITMS.

The present invention permits the elimination of heavy and large compressed gas cylinders by utilizing a hydrogen gas generator disposed in a vicinity of the ITMS instrument(s), (e.g. a metal hydride (MH) container or an electrolysis-based hydrogen generator) for the source of the hydrogen buffer gas, thereby providing ITMS with a buffer gas while maintaining ITMS performance at the level similar to that with helium buffer gas. The present invention thereby provides for the transportability of an ITMS by airplane, which is an important consideration for many portable MS instruments.

Figure 1:
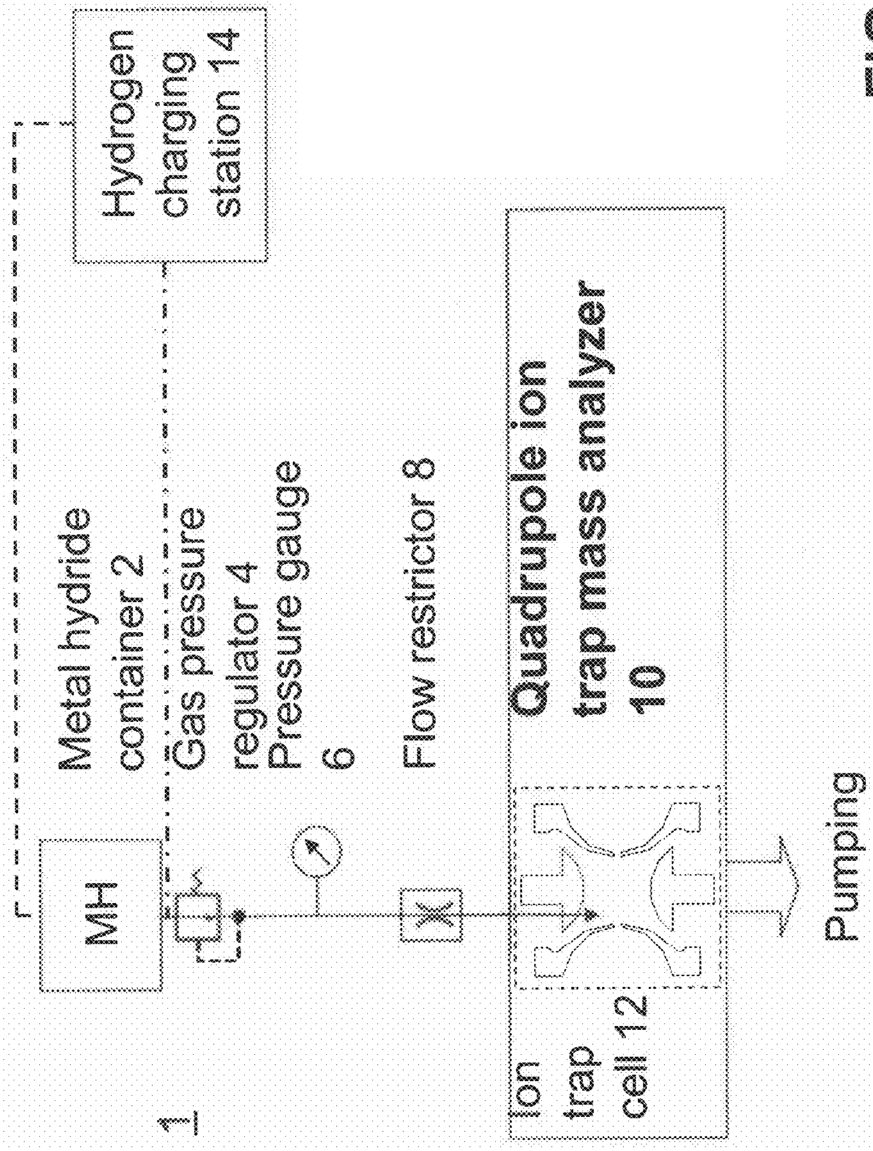
FIG. 1 is a schematic showing a block diagram of an ITMS system using hydrogen from a metal hydride container (or an electrolysis-based hydrogen generator instead of it) as a buffer gas.

FIG. 1 is a schematic showing a block diagram of an ITMS system 1 using hydrogen from a metal hydride (MH) container 2 as a buffer gas. In this embodiment, the metal hydride (MH) container 2 is a hydrogen gas generator disposed in a vicinity of the ITMS instrument which has the capability to generate hydrogen molecules to be supplied as a buffer gas to the ion trap. As used herein, the terms “generating” or “to generate” mean generating hydrogen from chemical compound(s) other than hydrogen itself. As used herein, the term “in vicinity of” means the hydrogen gas generator is part of the ion trap mass spectrometer or is connected to the ion trap mass spectrometer by plumbing which can deliver the hydrogen gas from the generator to the ion trap mass spectrometer of the ITMS system.

In one embodiment of this invention, the hydrogen generated by the MH container 2 is directed into the ion trap cell 12 using a gas line including for example a pressure regulator 4, a pressure gauge 6, and a gas flow restrictor 8. The hydrogen buffer gas is generated on demand (as it is consumed) from a metal hydride container where hydrogen chemically bound to metal is stored in a solid form. The pressure of the hydrogen buffer gas inside the ion trap cell (typically at 1 mTorr level) is a result of balance between the hydrogen gas supply provided by the gas line and pumping out the hydrogen gas by ITMS vacuum system.

The metal hydride method for hydrogen storage was developed in the last few years mainly for use in hydrogen fuel cells generating electric power. Recent achievements in the hydrogen MH storage technology has resulted in the production of miniature MH cartridges (the size of a regular electric battery for portable electronics and the weight of few ounces; e.g., model HydroSTIK, Horizon Fuel Cell Technologies Pte. Ltd., Singapore). These miniature MH cartridges are capable of storing many liters of hydrogen (typically 10 L at standard 1 atm pressure or 1 g of weight). Because the required flow rate of hydrogen buffer gas in ITMS is very small (typically at $10^{-4}$ L/min level), one AA size MH “battery” would be enough for couple months of continuous ITMS operation. In one embodiment of this invention, these miniature MH cartridges are used as the source of hydrogen for the ITMS.

Regardless of which MH source that is used, in one embodiment of the invention, there is provided a hydrogen charging station 14. Recharging can be done in few hours (overnight or at other convenient times). Hydrogen charging station 14 can be based on water electrolysis process (for example, using HydroFILL station from Horizon Fuel Cell Technologies Pte. Ltd., Singapore for the above mentioned HydroSTIK cartridges). In addition, MH cartridges can be recharged from regular compressed hydrogen cylinder (this brings the convenience of having several options for MH charging). The hydrogen charging station 14 (or any electrolysis-based hydrogen generator) can be used alone (i.e., without a metal hydride container) as a source of hydrogen buffer molecules in ITMS. In this case, the hydrogen charging station 14 is connected to the gas line instead of the MH cartridge. The use of a hydrogen charging station for direct supplying the hydrogen into the gas line brings benefit of generating hydrogen without a metal hydride container but this comes for the expense of extra size and weight typically associated with electrolysis-based hydrogen generators (compared to size and weight of MH cartridges). In this embodiment, the hydrogen charging station 14 is a hydrogen gas generator disposed in a vicinity of the ITMS instrument which has the capability to generate hydrogen molecules to be supplied as a buffer gas to the ion trap of the ITMS system.

In one aspect of the invention, the handling of MH cartridges is made safe because of small amount of hydrogen involved and because the hydrogen is contained in a solid form. Extraction of gaseous hydrogen from MH “battery” requires time and energy.

Due to recent changes in Federal regulations the MH cartridges in portable electronic devices can now be transported by all types of transportation, including airplanes. See Federal Register, Vol. 74, No. 9, Wednesday, Jan. 14, 2009, Rules and Regulations, pp. 2200-2270. This provides according to this invention an important benefit (in addition to size, weight, and safety) for using hydrogen MH containers in ITMS, as this capability makes ITMS utilizing hydrogen buffer gas a portable instrument which can be delivered to any global point within hours.

In one embodiment of this invention, the block diagram shown in FIG. 1 utilizes a commercial portable ion trap mass spectrometer (e.g., Model MT Explorer 100, MassTech Inc., Columbia Md.) with an inlet port for the hydrogen buffer gas connected to a metal hydride container (e.g., Model MH-20, Fuel Cell Store, Inc., Boulder, Colo.). To regulate the hydrogen gas flow, the gas line can include a gas pressure regulator (e.g., Model PRD3-2N2-2-V, Beswick Engineering, Greenland, N.H.), a pressure gauge, and a flow restrictor (as shown in FIG. 1).

Figure 2:
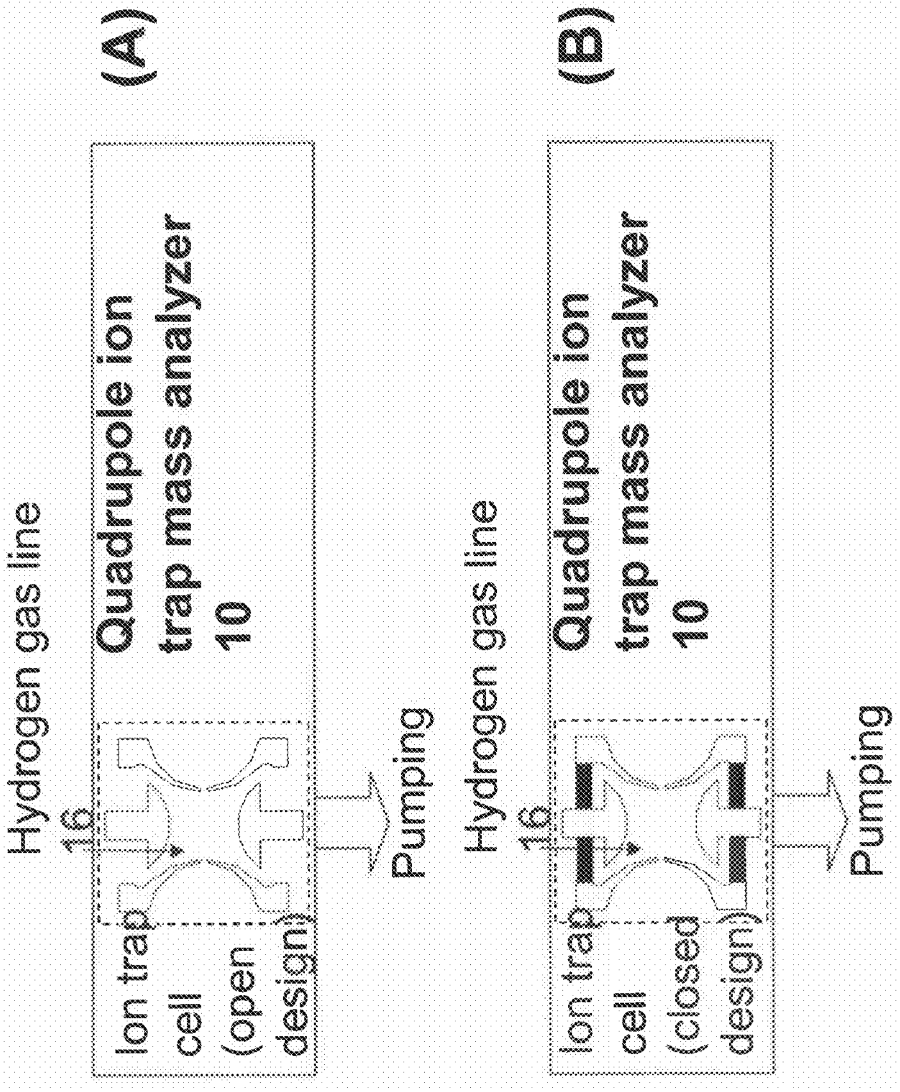
FIG. 2 is a schematic showing two typical ways of introduction of a buffer gas into the ion trap cell.

Via gas line connection 16, as shown in FIGS. 2A and 2B, hydrogen is supplied to an ion trap cell of the ITMS. The ion trap cell can have a closed design as shown in FIG. 2B where the ion trap cell is connected to the rest of the instrument vacuum chamber by a few small openings through which ions enter or leave the trap cell (entrance and exit holes, typically 1 mm diameter). The pressure inside the closed ion trap cell is a result of a balance between hydrogen supply to the cell through the gas line and a pumping through the small openings and should be around 1 mTorr. Practically the trap cell pressure is changed by setting different pressure level at the pressure regulator exit (typically at 5-45 PSI level). The required small flow is provided by a flow restrictor. In one embodiment, a piece of small glass capillary (ID 20 μm, 20 mm length) served as a flow restrictor. Commercially available porous media filters (High Purity Porous Metal Flow Restrictor, Mott Corporation, Farmington, Conn.) can also be used for this purpose.

In the case of an open cell design, as shown in FIG. 2A, the pressure in the vacuum chamber and inside the trap cell are equal so the pressure can be directly measured by the vacuum gauge connected to the vacuum chamber. In the case of the closed cell design (when solid spacers are used between the ring and end-cap electrodes), as shown in FIG. 2B, the pressure inside the trap cell is difficult to measure so in this case the pressure is set based on indirect measurements. In one indirect measurement, the pressure is calculated based on known gas flow rate and known size of the openings. In another indirect measurement, the optimum pressure is set based on the best mass resolution observed. Both measurement methods have resulted in the same pressure regulator setting.

Figure 3:
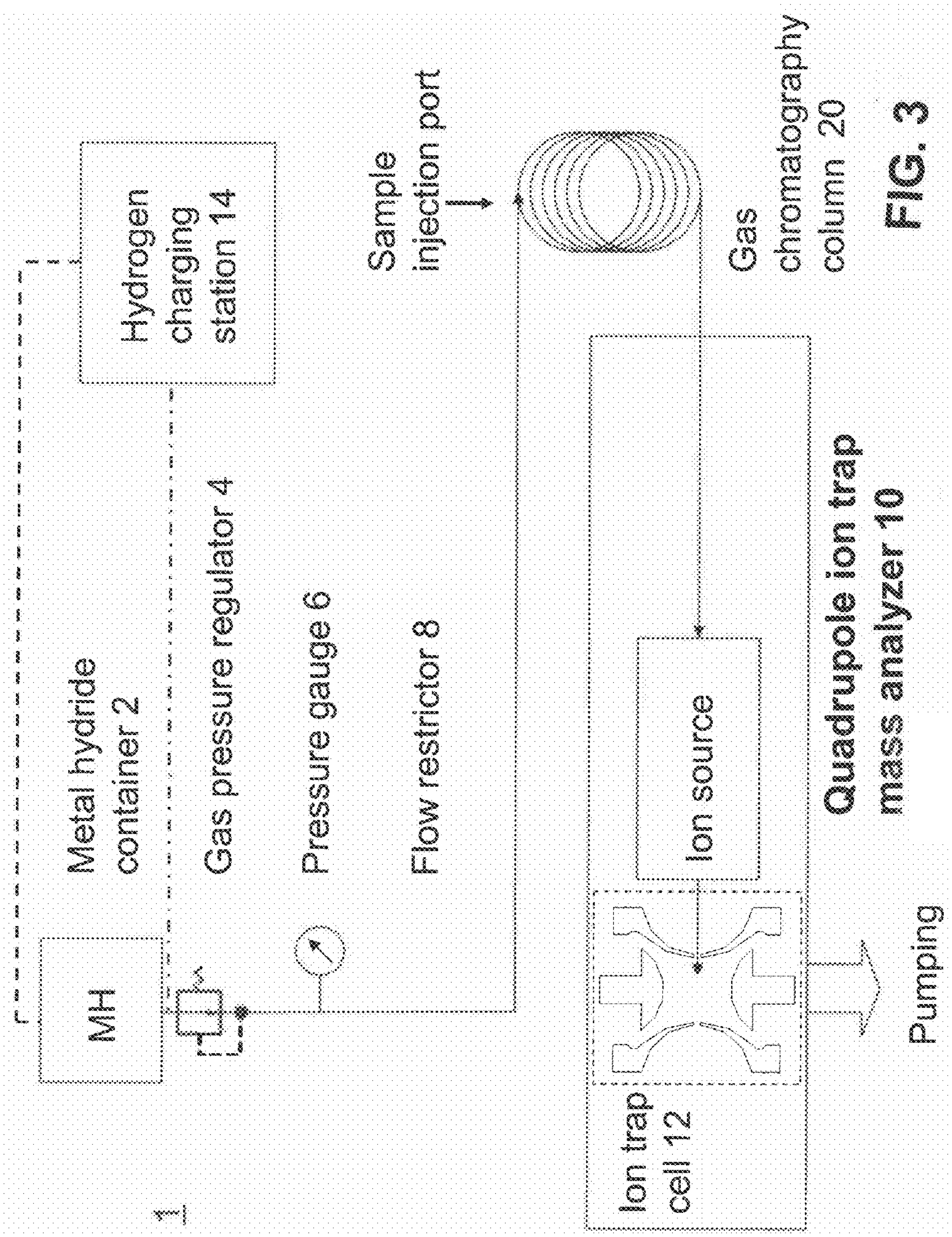
FIG. 3 is a schematic showing block diagram of an ITMS system with gas chromatography (GC) at the front end for separation of gas sample mixture before introducing it into ITMS, both GC and ITMS using hydrogen from a metal hydride container (or an electrolysis-based hydrogen generator) as a carrier gas and buffer gas, respectively.

In one embodiment of the invention, the ITMS or more generally the MS method can further include a gas chromatography unit (or step) for sample separation using hydrogen as a carrier gas, which can be supplied by the metal hydride storage container or the electrolysis-based hydrogen generator. As shown in FIG. 3, a gas chromatography (GC) column 20 in front of ITMS 10 is used for separation of a gas sample containing analyte molecules before introducing the analyte molecules into an ion source and directing the analyte ions generated in the ion source further to the ion trap cell. In this case, the hydrogen from the metal hydride container (or the electrolysis-based hydrogen generator) can also be used as a carrier gas in the GC column. Different ionization techniques (like electron ionization or chemical ionization) can be used for ionizing the analyte molecules in the ion source. The hydrogen gas flowing through the GC (or part of it) will enter the ion trap cell and serve as an ITMS buffer gas. (Typical gas load through the GC column is higher than that required for ITMS operation, but one MH cartridge would contain enough to supply the total GC-MS instrument for several days without recharging). In one embodiment of the invention, the use of the same hydrogen gas source for both GC and ITMS operation allows substantial weight and size reduction, and making total GC-MS system portable.

Regardless of the presence or absence of a gas chromatography unit, the ion trap MS operational procedures (in the case of using hydrogen as a buffer gas) were the same as those using helium as a buffer gas. In one embodiment of this invention, ions are generated by electrospray ionization (ESI) ion source. Other ion sources can be used for ion generation. After injecting ions into the trap (in one embodiment ions were produced outside the MS vacuum and introduced into the ion trap cell using an atmospheric pressure interface), the ions are cooled down in collisions with buffer gas molecules (typically 5-10 msec) to push ions into the trap cell center, and then, the ion trap is scanned by ramping the trapping radio-frequency (RF) AC voltage amplitude on the ring electrode and applying a resonance ejection AC voltage across the end-cap electrodes to sequentially eject ions of increased mass-to-charge (m/z) value to a detector. Other known ejecting techniques suitable for this invention include changing of a combined AC and DC voltages applied to the ring and end-cap electrodes. To obtain ion fragments in the MS/MS experiments, the parent ions are first excited by resonance excitation method (typically by a small AC voltage applied across the end-cap electrodes) to get additional kinetic energy. Then, the excited ions collide with the buffer gas molecules and pick up the internal energy required to fragment ions into the product (fragment) ions.

Accordingly, one method of the invention includes a mass spectrometry (MS) method which generates in a vicinity of the quadrupole ion trap hydrogen molecules, directs at least part of the hydrogen molecules into the quadrupole ion trap cell, applies AC and DC voltages to quadrupole ion trap cell electrodes to create a combined AC/DC trapping field, places sample ions inside the quadrupole ion trap cell, cools at least part of the ions inside the quadrupole ion trap cell using the hydrogen molecules as a buffer gas, scans the combined AC/DC trapping field to eject the ions from the quadrupole ion trap cell, and detects the ejected ions for measurement of mass-to-charge ratios of the ejected ions. The hydrogen molecules are also used as collision partners for fragmenting parent ions in tandem MS operational mode of the ion trap mass spectrometer.

Figure 4:
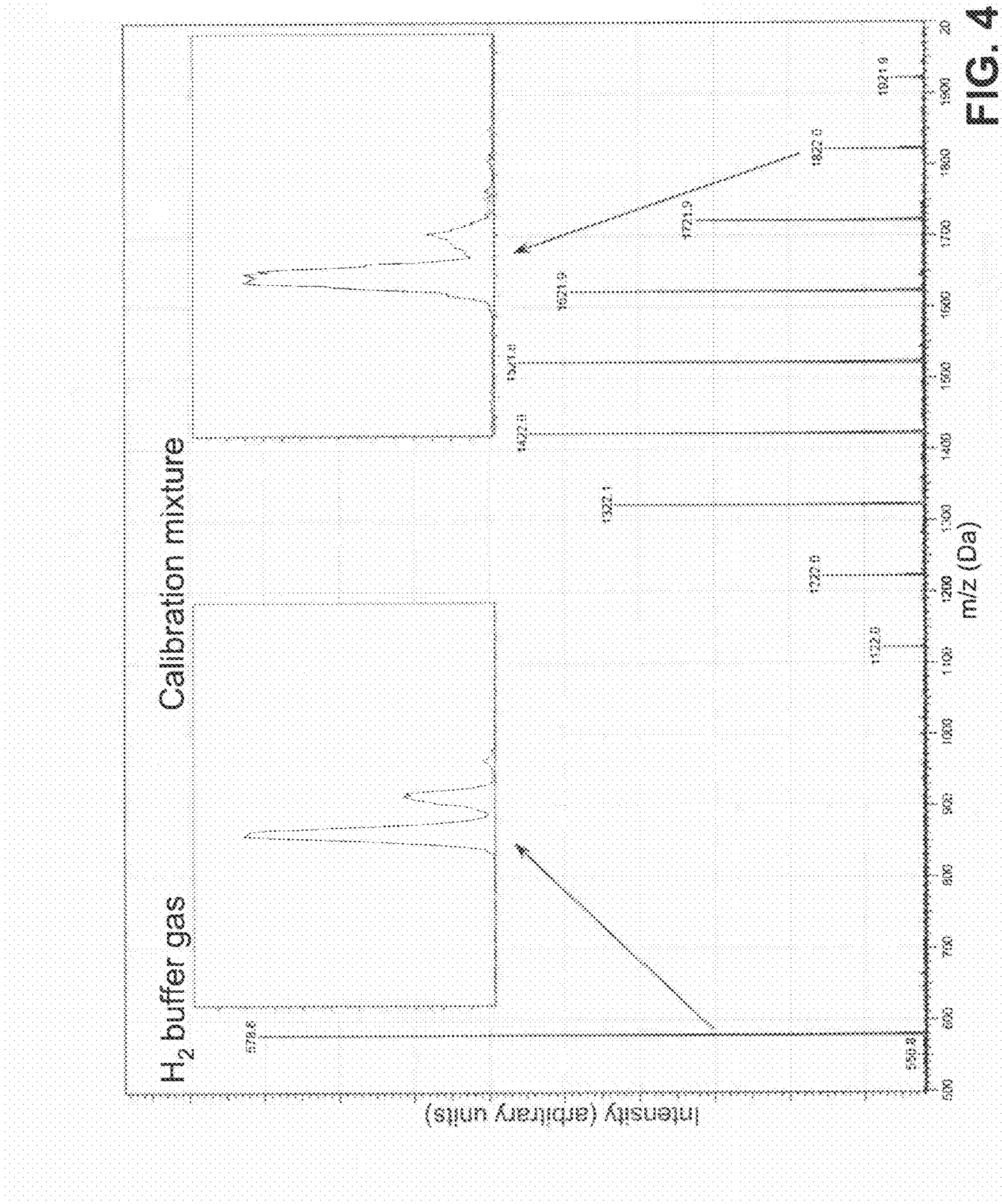
FIG. 4A is a schematic of MS spectra of a mixture containing tetra-decylammonium bromide and Ultramark 1621 (perfluoroalkylphosphazine) compounds obtained using hydrogen as a buffer gas.
FIG. 4B is a schematic of MS spectra of a mixture containing tetra-decylammonium bromide and Ultramark 1621 (perfluoroalkylphosphazine) compounds obtained using helium as a buffer gas.
Figure 4:
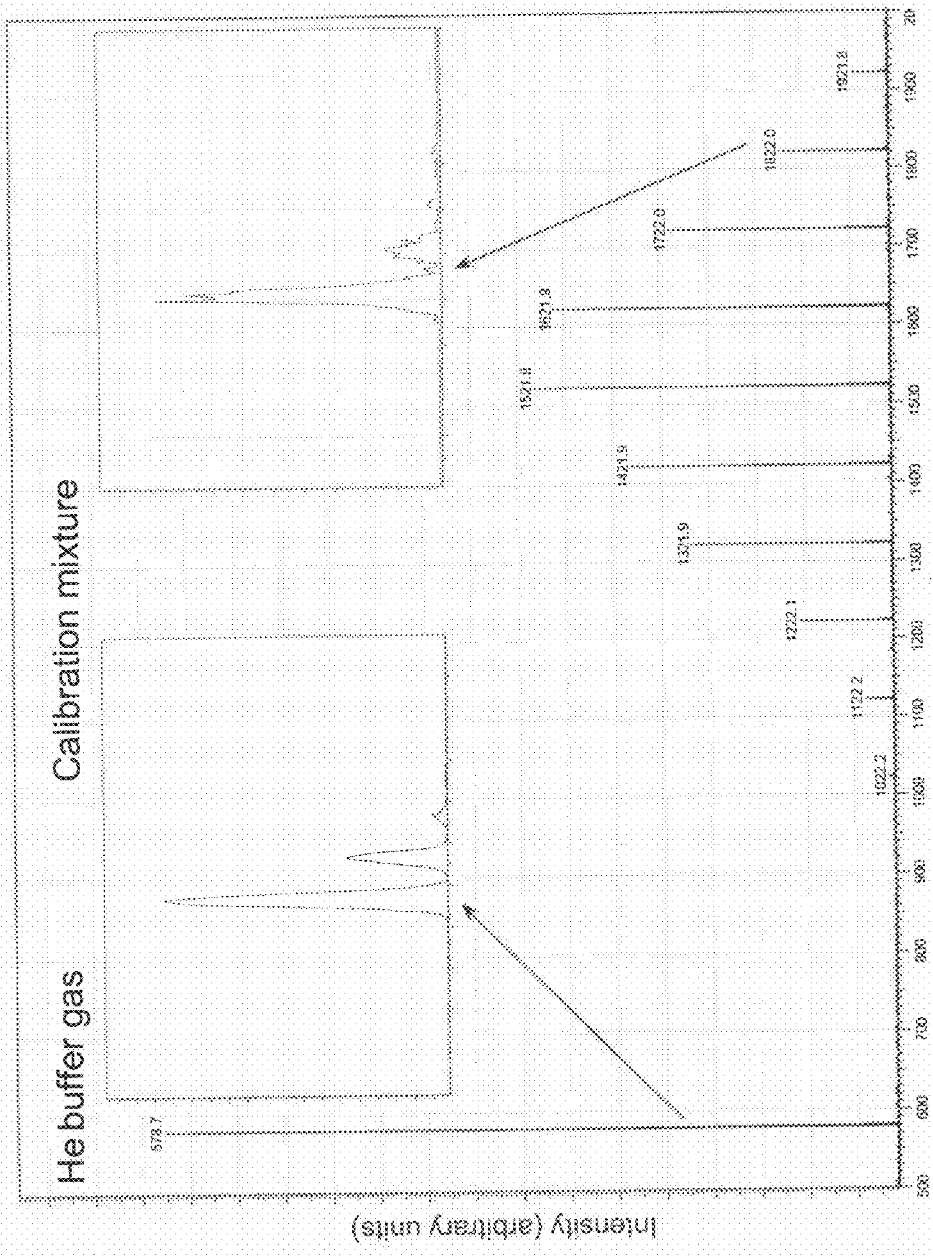
Figure 5:
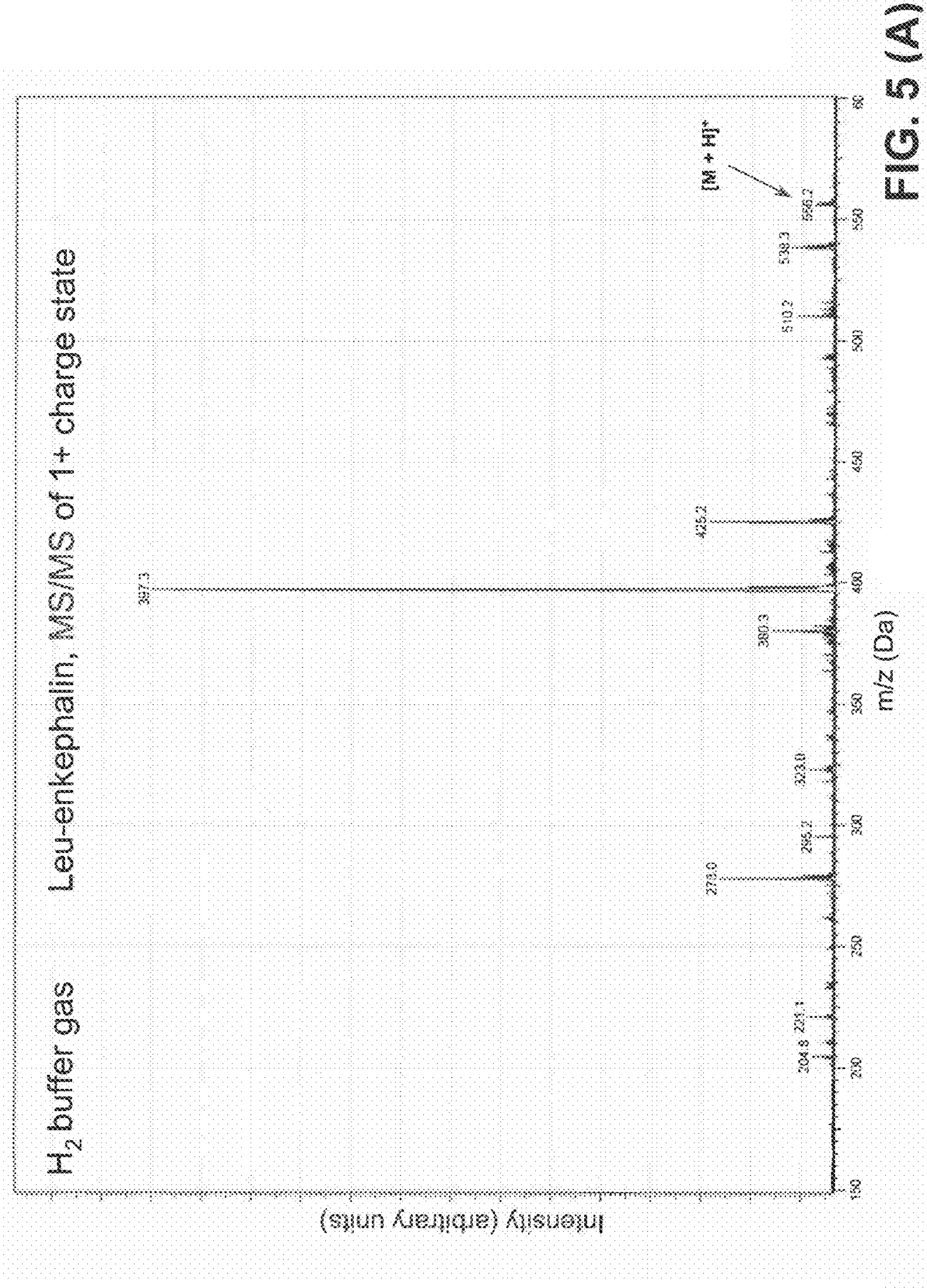
FIG. 5A is a schematic of MS/MS spectra of singly protonated leucine-enkephalin peptide (MW 555.6 Da) obtained using hydrogen as a buffer gas.
FIG. 5B is a schematic of MS/MS spectra of singly protonated leucine-enkephalin peptide (MW 555.6 Da) obtained using helium as a buffer gas.
Figure 5:
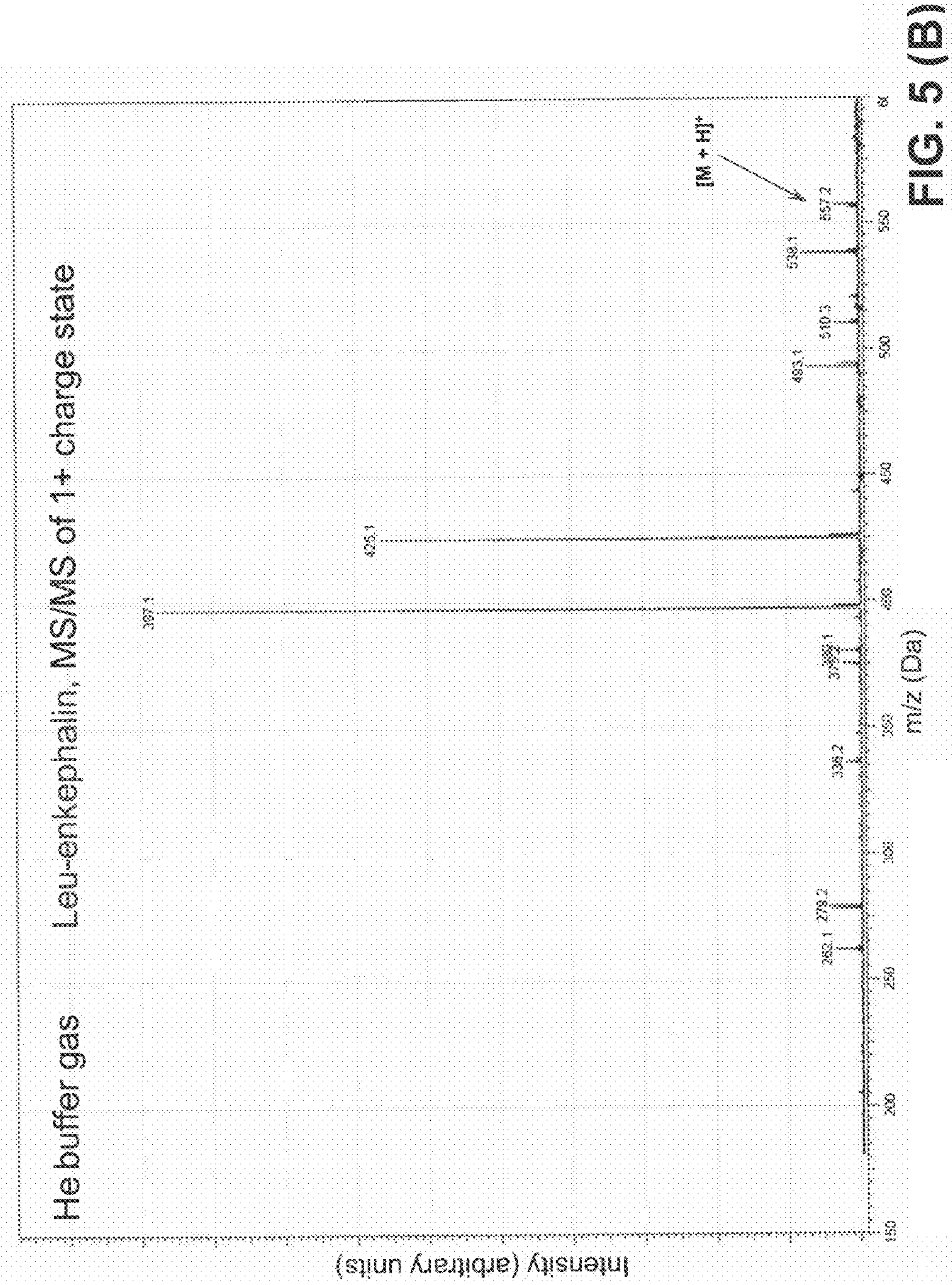
Figure 6:
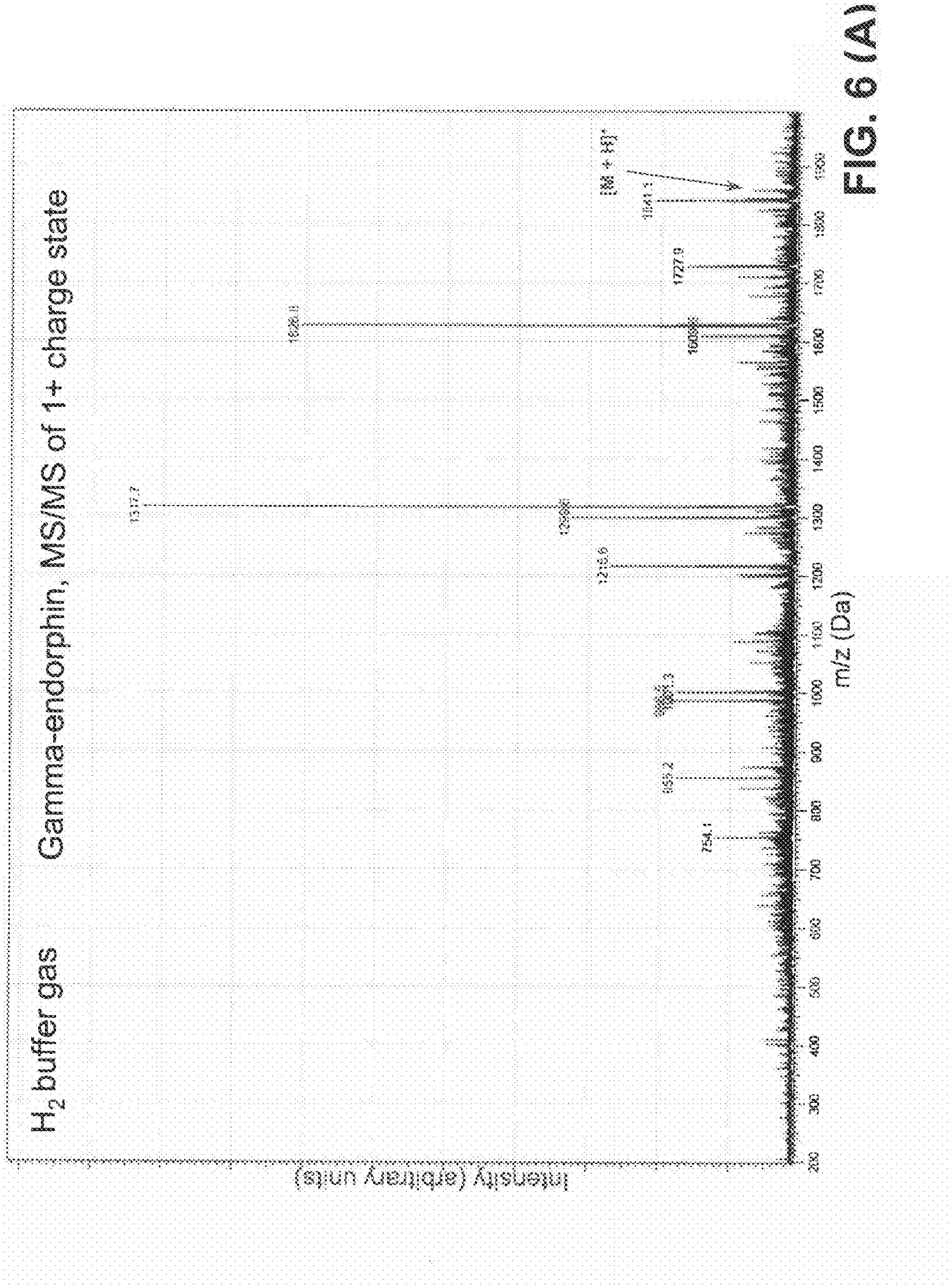
FIG. 6A is a schematic showing MS/MS spectra of singly protonated gamma-endorphin peptide (MW 1859.1 Da) obtained using hydrogen as a buffer gas.
FIG. 6B is a schematic showing MS/MS spectra of singly protonated gamma-endorphin peptide (MW 1859.1 Da) obtained using helium as a buffer gas.

Examples of MS and MS/MS (or tandem MS) spectra are shown in FIGS. 4-6 that demonstrate similar performance in terms of mass resolution (FIG. 4) and fragmentation efficiency (FIGS. 5-6) when hydrogen was used as a buffer gas instead of helium.

FIG. 4A is a schematic of MS spectra of a mixture containing tetra-decylammonium bromide and Ultramark 1621 (perfluoroalkylphosphazine) compounds (ionized in ESI source) obtained using hydrogen as a buffer gas. The insets demonstrate the mass resolution achieved for m/z=578 and m/z=1822 ions. This mixture is typically used for ITMS instrument calibration using low order polynomial approximation (quadratic polynomial approximation in our case) between the ion m/z value and the ejection RF voltage amplitude.

FIG. 4B is a schematic of MS spectra of a mixture containing tetra-decylammonium bromide and Ultramark 1621 (perfluoroalkylphosphazine) compounds obtained using helium as a buffer gas. The insets demonstrate the mass resolution achieved for m/z=578 and m/z=1822 ions. The same mass calibration and other ion trap operation parameters were used in the cases of hydrogen (FIG. 4A) and helium (see FIG. 4B)

buffer gases. The mass resolution and ion intensity distribution are similar on FIGS. 4A and 4B indicating about good cooling capabilities of hydrogen used as a buffer gas.

A comparison of the results between FIGS. 4A and 4B shows that this invention with hydrogen from a metal hydride container provides comparable mass resolution to that of conventional He use.

FIG. 5A is a schematic of MS/MS spectra of singly protonated leucine-enkephalin peptide (MW 555.6 Da) obtained using hydrogen as a buffer gas. The arrows with the $[M+H]^+$ label indicate the position of the parent ion. The major peaks at left side of the parent ion represent MS/MS products after fragmentation of the parent ions.

FIG. 5B is a schematic of MS/MS spectra of singly protonated leucine-enkephalin peptide (MW 555.6 Da) obtained using helium as a buffer gas. The arrows with the $[M+H]^+$ label indicate the position of the parent ion. The major peaks at left side of the parent ion represent MS/MS products after fragmentation of the parent ions.

A comparison of the results between FIGS. 5A and 5B shows that this invention with hydrogen from a metal hydride container provides comparable fragmentation efficiency and mass resolution to that of conventional He use.

FIG. 6A is a schematic showing MS/MS spectra of singly protonated gamma-endorphin peptide (MW 1859.1 Da) obtained using hydrogen as a buffer gas. The arrows with the $[M+H]^+$ label indicate the position of the parent ion. The major peaks at left side of the parent ion represent MS/MS products after fragmentation of the parent ions.

Figure 6B:
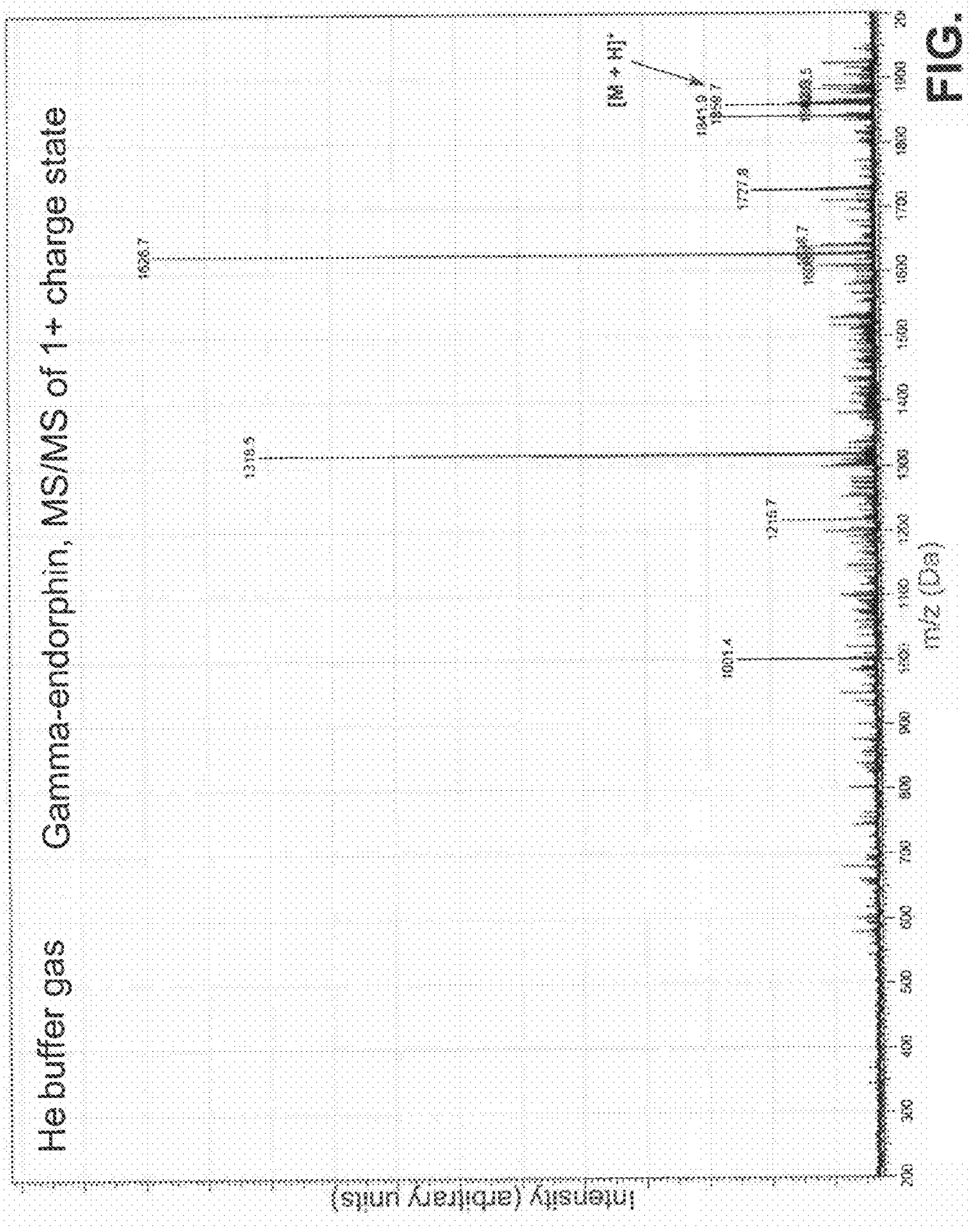

FIG. 6B is a schematic showing MS/MS spectra of singly protonated gamma-endorphin peptide (MW 1859.1 Da) obtained using helium as a buffer gas. The arrows with the $[M+Hr]^+$ label indicate the position of the parent ion. The major peaks at left side of the parent ion represent MS/MS products after fragmentation of the parent ions.

A comparison of the results between FIGS. 6A and 6B shows that this invention with hydrogen from a metal hydride container provides comparable fragmentation efficiency and mass resolution to that of conventional He use in the case of a heavy peptide ion (compared to leucine-enkephalin, see FIGS. 5A-B).

The invention claimed is:

1. A mass spectrometry method using a quadrupole ion trap, comprising:
- generating in a vicinity of the quadrupole ion trap hydrogen molecules;
- directing at least part of said hydrogen molecules into the quadrupole ion trap cell;
- applying AC and DC voltages to quadrupole ion trap cell electrodes to create a combined AC/DC trapping field;
- placing sample ions inside the quadrupole ion trap cell;
- cooling at least part of said ions using said hydrogen molecules as a buffer gas;
- changing the combined AC/DC trapping field to eject said ions from the quadrupole ion trap cell;
- detecting the ejected ions.

2. The method as in claim 1, wherein generating hydrogen molecules comprises generating the hydrogen molecules by at least one of a metal hydride storage container and an electrolysis-based hydrogen generator.

3. The method as in claim 2, wherein said metal hydride storage container comprises at least one of a fuel cell container or a rechargeable container.

4. The method as in claim 2, wherein the hydrogen in said electrolysis-based hydrogen generator is generated by electrolysis from water.

5. The method as in claim 1, wherein said quadrupole ion trap cell comprises a 3D ion trap cell.

6. The method as in claim 1, wherein said quadrupole ion trap cell comprises a linear ion trap cell.

7. The method as in claim 1, further comprising:
- fragmenting said ions in collisions with said hydrogen molecules into product ions.

8. The method as in claim 7, wherein said detecting comprises measuring mass-to-charge ratios of the product ions.

9. The method as in claim 1, wherein said placing comprises ionizing the sample in an ion source to produce the sample ions and injecting said ions into the ion trap cell.

10. The method as in claim 9, wherein in addition there is a sample separation by chromatography column before delivering the sample to the ion source.

11. The method as in claim 10, wherein the chromatography column utilizes a hydrogen carrier gas.

12. The method as in claim 11, wherein the hydrogen carrier gas used in the chromatography column is generated by said at least one of a metal hydride storage container and an electrolysis-based hydrogen generator.

13. The method as in claim 9, wherein said ion source utilizes at least one of an electron impact technique and a chemical ionization technique.

14. A quadrupole ion trap mass spectrometer system for mass-analyzing sample ions, comprising:
- an ion trap cell;
- a hydrogen gas generator disposed in a vicinity of the quadrupole ion trap mass spectrometer system, and which has the capability to generate hydrogen molecules to be supplied as a buffer gas to the ion trap; and
- gas-handling mechanisms which supply said hydrogen molecules into the ion trap cell.

15. The system as in claim 14, wherein said hydrogen gas generator comprises at least one of a metal hydride storage container and an electrolysis-based hydrogen generator.

16. The system as in claim 15, wherein said metal hydride storage container comprises at least one of a rechargeable container or a fuel cell container.

17. The system as in claim 15, wherein the hydrogen in said electrolysis-based hydrogen generator is generated by electrolysis of water.

18. The system as in claim 14, wherein said ion trap cell comprises a 3D ion trap cell.

19. The system as in claim 14, wherein said ion trap cell comprises a linear ion trap cell.

20. The system as in claim 14, further comprising:
- an ion exciter which fragments ions in collisions with said hydrogen molecules to obtain product ions.

21. The system as in claim 14, further comprising:
- a gas chromatography system for sample separation; and
- an ion source for ionizing sample molecules.

22. The system as in claim 21, further comprising:
- a carrier gas for said gas chromatography comprising a hydrogen carrier gas.

23. The system as in claim 22, wherein said hydrogen carrier gas is generated by said hydrogen gas generator.

24. The system as in claim 21, wherein said ion source is at least one of electron impact source and a chemical ionization source.

* * * * *